United States Patent [19]

Suzuki

[11] Patent Number: 4,879,205
[45] Date of Patent: Nov. 7, 1989

[54] INFORMATION STORAGE MEDIUM AND A METHOD OF MANUFACTURING THE SAME

[75] Inventor: Katsumi Suzuki, Tokyo, Japan

[73] Assignee: Kabushiki Kaisha Toshiba, Kawasaki, Japan

[21] Appl. No.: 96,507

[22] Filed: Sep. 15, 1987

[30] Foreign Application Priority Data

Jan. 20, 1987 [JP] Japan .................................. 62-10339
Jan. 20, 1987 [JP] Japan .................................. 62-10340
Jan. 20, 1987 [JP] Japan .................................. 62-10341
Jan. 20, 1987 [JP] Japan .................................. 62-10342

[51] Int. Cl.$^4$ .......................... G03C 1/72; G03C 1/80
[52] U.S. Cl. ................................... 430/523; 430/272; 430/945; 430/961; 430/964; 346/135.1
[58] Field of Search ............... 430/945, 495, 290, 523, 430/961, 964, 272, 346; 273; 346/135.1

[56] References Cited

U.S. PATENT DOCUMENTS 3,530,441 9/1970 Ovshinsky ........................... 340/173
4,410,581 10/1983 Nam ..................................... 430/945
4,661,420 4/1987 Nakamura et al. .................. 428/694

FOREIGN PATENT DOCUMENTS 0184452 6/1986 European Pat. Off. .
177446 9/1985 Japan ................................... 430/945
61-134944 6/1986 Japan .
2164269 3/1986 United Kingdom .

Primary Examiner—Paul R. Michl
Assistant Examiner—Lee C. Wright
Attorney, Agent, or Firm—Foley & Lardner, Schwartz, Jeffery, Schwaab, Mack, Blumenthal & Evans

[57] ABSTRACT

An optical disk is formed by stacking a polycarbonate substrate with a first protective layer of amorphous silicon, a recording layer of an InSb alloy, and a second protective layer of an ultraviolet-setting resin, in the order named. The first and second protective layers are formed by sputtering and spin-coating, respectively. After the recording layer of the optical disk, formed in this manner, is subjected to initial crystallization, a light beam is applied to the recording layer. Thereupon, the irradiated portion of the recording layer undergoes phase transformation, thus forming recording marks in different crystal phases. Information is read by applying a weak laser beam to the recording layer with the recording marks therein. As the recording marks are cooled gradually by being exposed to a laser beam, they undergo phase transformation, so that the information is erased.

14 Claims, 3 Drawing Sheets

INFORMATION STORAGE MEDIUM AND A METHOD OF MANUFACTURING THE SAME

BACKGROUND OF THE INVENTION

1. Field of the Invention

The present invention relates to an information storage medium and a method of manufacturing the same, in which information is recorded and erased by applying a light beam, such as a laser beam, to a recording layer so that the irradiated portion of the recording layer undergoes phase transformation.

2. Description of the Prior Art

Optical disks of a phase-transformation type are conventionally known as an erasable optical disk. In these optical disks, information is recorded and erased by utilizing reversible phase transformation of an irradiated portion of a recording layer between crystalline and amorphous structures, for example, which should be caused when a laser beam is applied to the recording layer.

Materials capable of such phase transformation include, for example, semiconductors, semiconductor compounds, and intermetallic compounds, such as Te, Ge, TeGe, InSe, SbSe, SbTe, etc. These materials alternatively assume two phases, crystalline and amorphous, depending on temperature. The complex index of refraction, which is given by $N=n-ik$, varies depending on the phase. Accordingly, information is recorded and erased by reversibly changing the phase through heat treatment with use of a laser beam (S.R. Ovshinsky: Metallrgical Transactions 2 641 1971).

Besides the method described above, there is a system in which information is recorded and erased by reversible phase transformation between different crystal structures through irradiation with a laser beam (Japanese Patent Disclosure No. 61-134944). InSb is a well-known example of material capable of such phase transformation.

A thin film of an InSb alloy develops into a fine crystal structure when it is exposed to a low-power laser beam with a relatively long pulse width. If a high-power laser beam with a short pulse width is applied to the alloy film, on the other hand, the film develops into a relatively coarse crystal structure. These two crystal structures have different complex indexes of refraction, and their states are discriminated by a difference in reflected light quantity, for example, obtained when information is read by applying a laser beam.

According to the aforementioned method in which information is recorded and erased by phase transformation between crystalline and noncrystalline structures, the stability of the noncrystalline structure at the recording portion (indicated by recording mark hereinafter) may be low. In the recording and erasing method based on the phase transformation between different crystal structures, however, the stability of the recording mark is satisfactory. If a recording layer formed of an InSb film is left under the atmosphere of a temperature of 70° C. and a relative humidity of 90% for about three months after recording, the recording mark remains stable. In this respect, the latter method is superior to the former.

Meanwhile, the optical disks of the phase-transformation type are generally constructed as shown in FIG. 1, without regard to the aspect of phase transformation. Protective layer 2, formed of a dielectric material stable both chemically and thermally, is formed on substrate 1 of glass or an organic resin which is transparent to light. Recording layer 3 is formed on protective layer 2, and protective layer 4 of the same material as layer 2 is formed on layer 3. For protection against flawing, moreover, protective layer 5 of an ultraviolet-setting resin is formed on layer 4.

Among these layers, protective layers 2 and 4 have the following functions.

(1) When a laser beam is applied to recording layer 3, layers 2 and 4 prevent layer 3 from abrasion by heat, and from being deformed by repeated recording and erasing operations.

(2) In reading operation, layers 2 and 4 enhance signals by utilizing optical interference.

(3) In the case that the phase transformation occurs between crystalline and amorphous structures, layers 2 and 4 facilitate radiation of heat from recording layer 3 and hence, uncrystallization by rapid cooling, during the laser-beam irradiation.

(4) In the case that the phase transformation occurs between different crystal structures, layers 2 and 4 thermally insulate recording layer 3, thereby restraining heat radiation therefrom, and help layer 3 to be gradually cooled to solidify after melting.

In general, $SiO_2$ is used for these protective layers.

However, the optical disks of the crystal-to-crystal phase-transformation type, especially those optical disks whose recording layer is formed of an InSb alloy, have the following problem. Suppose protective layers 2 and 4 are formed of $SiO_2$, and a amorphous film, at an as-deposited state, is intended for initial crystallization by continuous laser-beam irradiation. In this case, if the angular velocity of the optical disk is as low as 100 to 150 rpm, initialization is accomplished by applying a laser beam of 6-mW output or thereabout to one and the same track portion once or twice. If the angular velocity ranges from 900 to 1,000 rpm, the same track portion must be irradiated as frequently as six to eight times, even though the output of the laser beam is as high as 10 mW.

Also in the erasing operation, information on the recording portion can be erased by applying a low-output laser beam of 6 mW or thereabout only once, if the angular velocity of the optical disk is 300 rpm or less. If the angular velocity is 1,000 rpm or more, however, part of the recorded information remains unerased seen though a laser beam of 10 mW is applied to the same recording portion twice or thrice.

Such a problem may be solved by high power output of the laser beam. Currently, however, commercially available miniature semiconductor lasers can deliver an output of only 30 mW at the most. Even if the actual output is 30 mW, an output of only about 10 mW, which is substantially equivalent to the aforesaid output, can be applied as an effective output to the disk surface through an optical system.

SUMMARY OF THE INVENTION

The object of the present invention is to provide an information storage medium and a method of manufacturing the same, in which initialization of a recording layer and erasure of recorded information can be performed at higher speed, and defective initialization and deficient erasure can be minimized.

An information storage medium according to an aspect of the present invention comprises a substrate, a recording layer adapted to undergo phase transformation between different crystal phases when exposed to a light beam, a first protective layer interposed between the substrate and the recording layer, and a second protective layer disposed on the recording layer, the first and second protective layers containing amorphous silicon and an organic resin, respectively.

An information storage medium according to another aspect of the invention comprises a substrate, a recording layer adapted to undergo phase transformation between different crystal phases when exposed to a light beam, whereby information is recorded and erased, a first protective layer interposed between the substrate and the recording layer, and a second protective layer disposed on the recording layer, the first and second protective layers containing amorphous silicon.

A method of manufacturing an information storage medium comprises steps of forming a first protective layer containing amorphous silicon on a substrate by sputtering, forming a recording layer on the first protective layer, the recording layer being adapted to undergo phase transformation between different crystal phases when exposed to a light beam, whereby information is recorded and erased, and forming a second protective layer containing an organic resin or amorphous silicon on the recording layer.

In recording or erasing information by applying a light beam to the recording layer so that the irradiated portion thereof undergoes phase transformation between different crystal phases, the irradiated portion must be cooled gradually for satisfactory crystallization. According to the present invention, the first or substrate-side protective layer is formed of amorphous silicon, while the second protective layer, on the opposite side of the recording layer to the first protective layer, is formed of an organic resin or amorphous silicon. These materials have a lower heat diffusion coefficient than $SiO_2$ which has conventionally been used as a material for the protective layers. Therefore, the irradiated portion of the recording layer can be insulated thermally, so that it can be solidified by gradual cooling of latent heat and crystallized securely. Thus, defective initialization and deficient erasure can be significantly minimized, that is, the initialization characteristic and erasing characteristic can be improved. These effects can be ensured further by making the thickness of the amorphous-silicon protective layer greater than 100 Å and smaller than 2,800 Å. Since the amorphous silicon layer is formed by sputtering, the heat diffusion coefficient is lowered additionally.

Since the second protective layer contains an organic resin, it is not essential to form two or more protective layers on the recording layer.

BRIEF DESCRIPTION OF THE DRAWINGS

A more complete appreciation of the invention and many of the attendant advantages thereof will be readily understood by reference to the following detailed description when considered in connection with the accompanying drawings, in which.

DETAILED DESCRIPTION OF THE PREFERRED EMBODIMENTS

Figure 1:
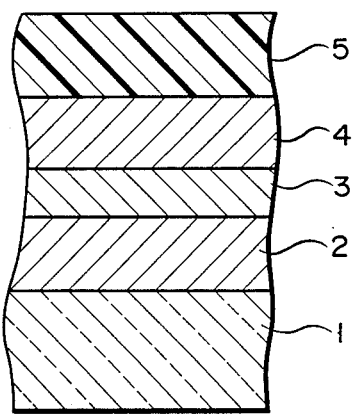
FIG. 1 is a sectional view of a prior art information storage medium (optical disk) having a recording layer of a phase-transformation type.

In the case of an optical disk such that information is recorded or erased by crystalline phase transformation, the greater the adiabatic capacity of protective layers between which a recording layer is sandwiched, that is, the greater the capacity to suppress heat radiation, the more quickly the phase transformation can be made. Thus, the initial crystallization characteristic and erasing characteristic can be improved. The lower the rate of heat diffusion, the greater the capacity to suppress heat radiation from the recording layer will be. Conventionally, suitable inorganic materials for the protective layers whose coefficient of heat diffusion is lower than that of $SiO_2$ have not been found.

In extensive experimentation, however, the inventors hereof used the following structure for an optical disk, and found a substantial increase in the capacity to thermally insulate the recording layer, and improvement in recording characteristic, as well as in the initial crystallization characteristic and erasing characteristic. In this structure, the protective layer on the substrate side of the recording layer is formed of amorphous silicon (hereinafter referred to as a-Si). The outside protective layer of the recording layer is formed of an ultraviolet-setting resin or some other organic resin, which is adapted for use as a surface coating, or a-Si, as is used for the substrate-side layer.

The heat diffusion rate of $SiO_2$, for example, is 0.014 $cm^2/sec$, and that of crystalline silicon is 0.1 $cm^2/sec$. When the inventors hereof prepared an a-Si film by sputtering, using Si as a target, the heat diffusion rate of a-Si proved as low as 0.005 $cm^2/sec$. Thus, the heat diffusion rate of a-Si can be made very low by suitably selecting the manufacturing method. Organic resins have a lower heat diffusion rate than these inorganic materials, thereby producing a greater adiabatic effect. The protective layer outside the recording layer can be kept at a relatively low temperature even though it is exposed to a light beam. Therefore, the outside protective layer can be formed of an organic resin, instead of such a dielectric material as is used in the prior art storage medium or method. Thus, desired initialization and erasing characteristics can be obtained by forming the protective layer in the aforesaid manner. Since a-Si is more stable against heat than organic resin, it is preferably used for the outside protective layer if thermal stability is regarded as important.

If the a-Si layer has a thickness of 100 Å or less, it will diffuse into the recording layer, thereby affecting it adversely. If the thickness of the a-Si layer is 2,800 Å or more, on the other hand, the initialization and erasing characteristics resemble those obtained by the prior art method. Accordingly, the thickness of the a-Si layer is restricted to a range from 100 Å to 2,800 Å. If the layer thickness ranges from 300 to 1,200 Å, in particular, the initialization and erasing characteristics are improved with high efficiency.

Figure 2:
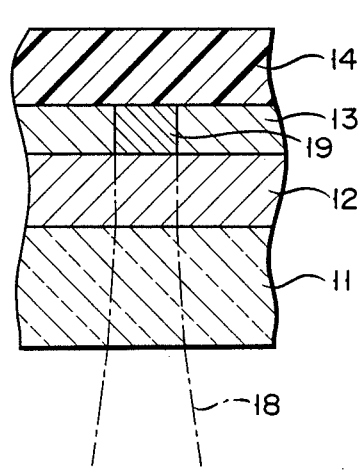
FIGS. 2 and 3 are sectional views showing information storage media (optical disks) according to the first and second embodiments, of the present invention.

Preferred embodiments of the present invention will now be described in detail with reference to the accompanying drawings. FIG. 2 is a sectional view showing an information storage medium (optical disk) according to an embodiment of the invention. In FIG. 2, substrate 11 is formed of a transparent material, such as glass or polycarbonate resin, which is less susceptible to a change over time. Protective layer 12, recording layer 13, and protective layer 14 are formed successively on substrate 11. Recording layer 13 is sandwiched between protective layers 12 and 14. Layers 12 and 14 serve to prevent layer 13 from abrasion, and to thermally insulate layer 13, thereby restraining radiation of heat from layer 13. Each protective layer has the aforementioned thickness. Protective layers 12 and 14 are formed of a-Si and organic resin, such as ultravioletsetting resin, respectively. Besides the aforesaid functions, layer 14 serves to protect the surface of the disk against flaws or the like. Recording layer 13, which is formed of e.g. an InSb alloy, has a thickness of 700 Å for example. Layer 13 undergoes a phase transformation between two different crystal structures, depending on the conditions for laser-beam irradiation.

Figure 3:
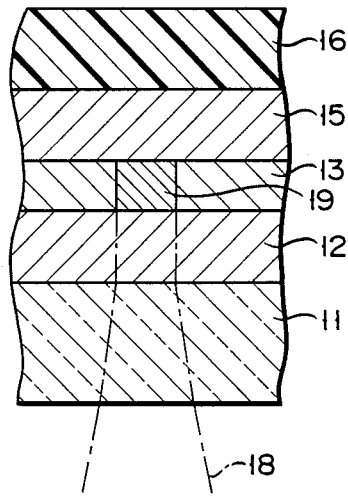

FIG. 3 is a sectional view showing an information storage medium (optical disk) according to another embodiment of the present invention. In the optical disk of FIG. 3, substrate 11, first protective layer 12, and recording layer 13 are constructed in the same manner as their counterparts in the optical disk of FIG. 2. Second protective layer 15 is formed on recording layer 13, and third protective layer 16 is formed on layer 15. Layer 15 is formed of the same a-Si for protective layer 12, and shares the range of thickness therewith. Like protective layer 14, protective layer 16 is formed of an organic resin, such as an ultraviolet-setting resin. Layer 15, along with layer 12, has a function to insulate recording layer 13 thermally. Layer 16 serves to protect the disk surface against flaws or the like.

Although protective layer 1 should preferably be used, it is not indispensable.

The operation of the optical disk with the aforementioned construction will now be described.

Initialization

Recording layer 13 is amorphous at an as-deposited state. For information recording, however, layer 13 must be crystalline. Accordingly, a laser beam is applied continuously to layer 13, thereby melting and then gradually cooling layer 13 to solidify it. Thus, the recording layer is phase-transformed into a crystalline structure having a relatively fine crystal texture.

Recording

Short-pulse laser beam 18 is applied selectively to initialized recording layer 13, and a fine crystal at the irradiated portion of layer 13 is developed quickly to form recording mark 19 having a relatively coarse crystal texture.

Reading

A relatively weak laser beam is applied to recording layer 13, and information is read by detecting the difference in intensity between reflected light beams from recording mark 19 and the remaining portion.

Erasure

A laser beam is applied to recording mark 19 under the same conditions as those for the initialization. As in the case of the initialization, mark 19 is melted, and solidified by gradual cooling, thus developing into a fine crystalline structure.

Figure 4:
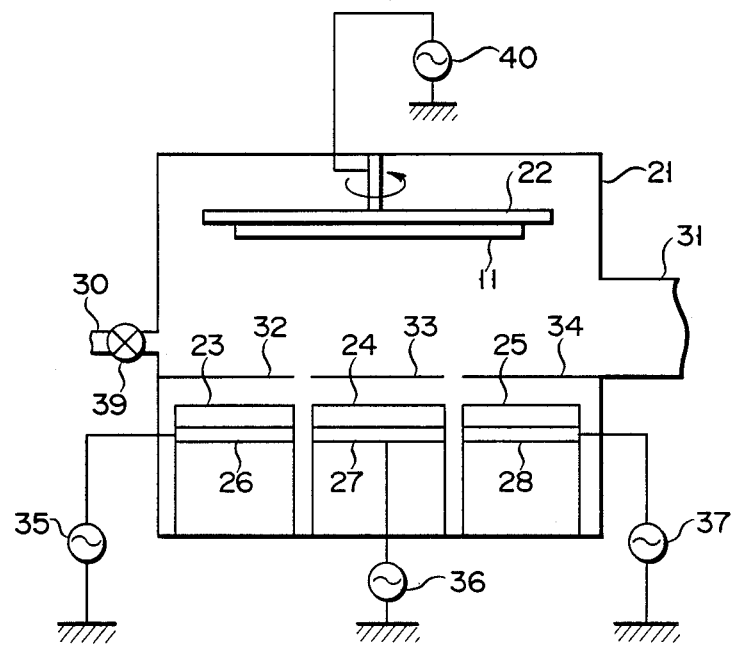
FIG. 4 is a schematic view showing a sputtering apparatus for manufacturing the information recording media according to the second embodiment of the invention.

A method of manufacturing the optical disk according to the first embodiment will now be described. FIG. 4 is a schematic view of a sputtering apparatus for forming the first protective layer and the recording layer. In FIG. 4, numeral 21 denotes a reaction container. Exhaust port 31 and gas inlet port 30 are attached to the peripheral wall of container 21. A cryo-pump (not shown) is coupled to exhaust port 31, whereby reaction container 21 is exhausted. An argongas supply unit (not shown) is coupled to gas inlet port 30 so that argon gas from the supply unit is introduced into container 21 through port 30. Disk-shaped substrate 11 is supported by rotating holder 22 inside reaction container 21, at the upper portion thereof, so that the surface of substrate 11 is horizontal. Substrate 11 is rotated by rotating the holder by means of a motor (not shown). Flat electrodes 26, 27 and 28 are arranged inside container 21 so as to face substrate 11. Electrodes 26, 27 and 28 are connected to RF (radiofrequency) power sources 35, 36 and 37, respectively. In-target 23, Si-target 24, and Sb-target 25 are disposed on electrodes 26, 27 and 28, respectively. Shutters 32, 33 and 34 are interposed between substrate 11 and targets 23, 24 and 25, respectively.

In this film-forming apparatus, reaction container 21 is first evacuated to a vacuum of e.g. $10^{-6}$ torr by means of the cryo-pump. Then, argon gas is introduced into container 21 at a flow rate of e.g. 10 sccn, thereby adjusting the gas pressure inside container 21 to a predetermined value, e.g., 5 motor. While rotating substrate 11 at e.g. 60 rpm, RF power of e.g. 200 W is supplied from RF power source 36 to Si-target 24 through electrode 27. Thus, a-Si protective layer 12 with a predetermined thickness is formed on substrate 11, with a thickness of 1,000 Å, for example. In this case, shutter 33 is opened, and shutters 32 and 34 are closed. Then, shutter 33 is closed, and shutters 32 and 34 are opened, whereupon RF power of e.g. 100 W is supplied from power sources 35 and 37 to targets 23 and 25 through electrodes 26 and 28, respectively. Thus, recording layer 13 of e.g. $In_{47}Sb_{53}$ with a predetermined thickness is formed with a thickness of 1,000 Å, for example. In this case, the relationship between the power supplied to targets 23 and 25 and the composition of recording layer 13 is determined in advance.

Thereafter, a disk sample, formed with first protective layer 12 and recording layer 13 by sputtering, is removed from the sputtering apparatus, and an ultraviolet-setting resin is applied to the surface of recording layer 13 by spin-coating method. Ultraviolet rays are applied to the resin to form protective layer 14 with a thickness of e.g. 10 μm.

When providing a-Si protective layer 15 on recording layer 13, it is formed under the same conditions as protective layer 12 after layer 13 is formed. In disposing protective layer 16 on layer 15, thereafter, it is formed in the same manner as protective layer 14.

Figure 5:
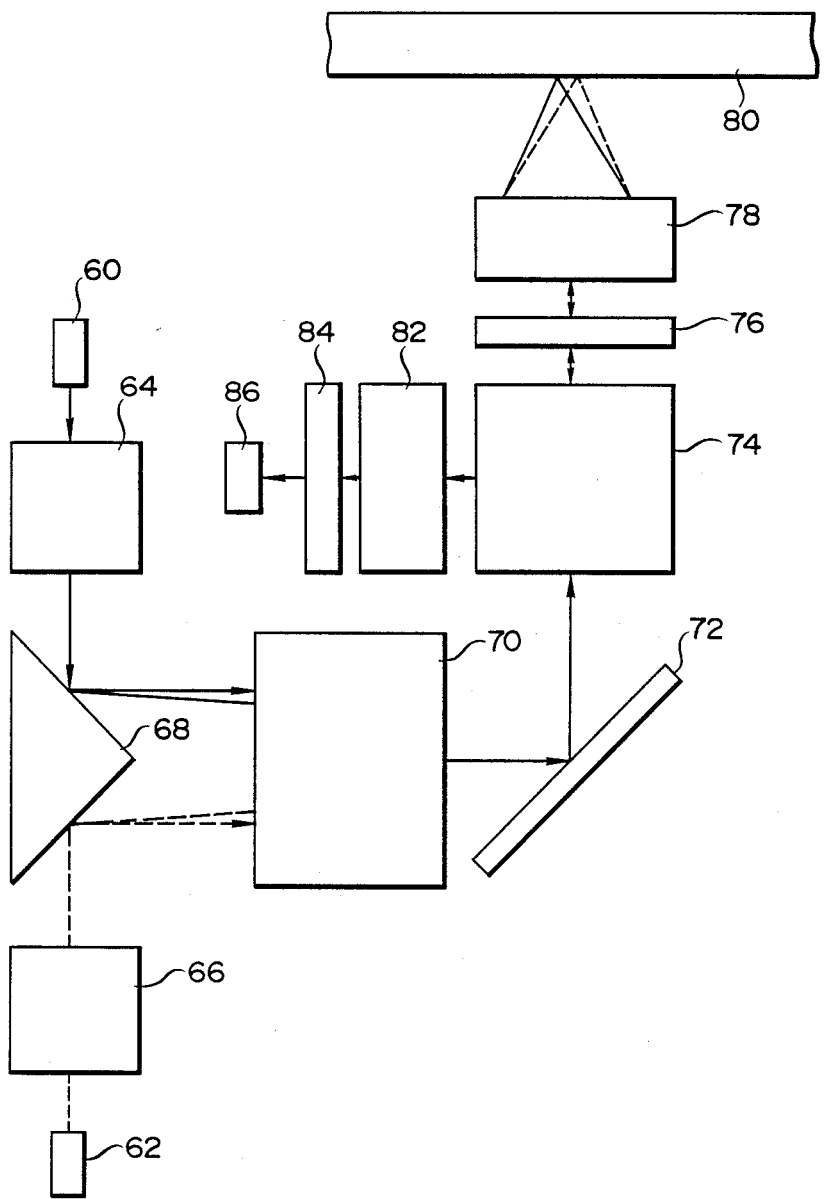
FIG. 5 is a schematic view showing a control optical system for recording information on the information storage medium according to the second embodiment, or reading or erasing the recorded information.

Referring now to FIG. 5, a control optical system, which is used to record, read, or erase information on or from the information storage medium (optical disk) according to these embodiments, will be described in detail.

The optical system comprises semiconductor laser diode 60 for recording and reading information and semiconductor laser diode 62 for erasing information recorded on the optical disk. A laser beam emitted from diode 60 or 62 is focused by lens 64 or 66, and reflected by mirror 68. The reflected light from mirror 68 enters lens 70 in parallel relation to the optical axis, and is then reflected by mirror 72. The reflected laser beam from mirror 72 is introduced into beam splitter 74 and then into polarizing plate 76, whose thickness is equal to about one quarter of the wavelength of the applied laser beam. Then, the laser beam enters lens 78 and is focused thereby on optical disk 80. Lens 78 is movably supported by a drive mechanism (not shown), which serves to adjust the position of lens 78 radially and axially. Disk 80 is rotated at a speed of 10 m/s.

The reflected light from optical disk 80 enters lens 78 again and passes through plate 76. At this time, the light is polarized as it moves back and forth within plate 76, so that it is reflected by beam splitter 74 and deflected toward converging lens 82 and column lens 84. The reflected light from optical disk 80 is detected by detector 86. Lens 78 is moved by the drive mechanism so that the converged spot from lens 78 focuses on disk 80.

In recording information, a pulsating light beam (recording beam) corresponding to the information to be recorded is emitted from laser diode 60. The recording beam is applied to a predetermined portion of the recording layer of optical disk 80. The irradiated portion develops into a recording mark after undergoing the aforementioned phase transformation.

In reading information, a laser beam with an output one-tenth that of the recording beam is emitted continuously from laser diode 60. This laser beam passes through the substrate of optical disk 80, and is reflected by the recording layer. Detector 86 detects the intensity of the reflected light from the recording layer. In this case, the recording mark and the other portion of the recording layer are different in crystal grain size, as mentioned before, so that reflected light beams from these different portions are different in intensity. Thus, based on the difference in intensity between the reflected beams, the recorded information can be read securely.

In erasing information, an erasing laser beam is emitted continuously from laser diode 62 to be applied to the recording mark. Thereupon, the recording mark undergoes phase transformation such that it changes into a fine crystal resembling the other portion, in the manner as aforesaid. As a result, the information is erased.

Examples of characteristic tests on information recording media manufactured according to the present invention will now be described.

EXAMPLE 1

An a-Si layer, as a first protective layer, was deposited to a thickness of 2,400 Å on a grooved polycarbonate substrate by argon-sputtering. Then, a recording layer of $In_{47}Sb_{53}$ was deposited with a thickness of 700 Å on the a-Si layer. Thereafter, an ultraviolet-setting resin layer of 10μm thickness, as a second protective layer, was formed on the recording layer, and the resulting optical disk was designated as Sample A. Under the same film-forming conditions, optical disks were prepared such that their a-Si protective layers had thicknesses of 1,200, 800, 600, 300, and 100 Å, individually. These disks were designated as Samples B, C, D, E and F, individually. For comparison, an $SiO_2$ protective layer was deposited with a thickness of 1,100 Å on the substrate, and a recording layer was deposited with a thickness of 700 Å thereon. Further, another protective layer of $SiO_2$ was deposited with a thickness of 1,100 Å on the recording layer, and a coating layer of an ultraviolet-setting resin was formed thereon. The resulting optical disk was designated as Sample G. The characteristics of these samples were evaluated by means of a dynamic-characteristic tester. A semiconductor laser with a wavelength of 830 nm was used in the tests. For the initialization, a laser beam of 8 mW output was applied continuously. In recording information, a laser beam of 10 mW output, 200 ns pulse width, and 50% duty ratio was applied pulsatively. In an erasing operation, a laser beam of the same output as that for the initialization was applied continuously. Table 1 shows results of these tests.

TABLE 1

|  | Rotational Frequency (rpm) | Number of Irradiation for Initialization (mv) | Recording-Mark Regenerative Signal (mv) | Unerased Signal (mv) |
|---|---|---|---|---|
| Sample A | 200 | 1 | 200 | 0 |
|  | 400 | 2 | 180 | 0 |
|  | 800 | 4 | 170 | 20 |
|  | 1200 | 8 | 150 | 30 |
| Sample B | 200 | 1 | 200 | 0 |
|  | 400 | 1 | 200 | 0 |
|  | 800 | 3 | 170 | 10 |
|  | 1200 | 5 | 140 | 20 |
| Sample C | 200 | 1 | 200 | 0 |
|  | 400 | 1 | 200 | 0 |
|  | 800 | 3 | 170 | 10 |
|  | 1200 | 4 | 140 | 20 |
| Sample D | 200 | 1 | 150 | 0 |
|  | 400 | 1 | 150 | 0 |
|  | 800 | 1 | 130 | 0 |
|  | 1200 | 2 | 120 | 0 |
| Sample E | 200 | 1 | 130 | 0 |
|  | 400 | 1 | 130 | 0 |
|  | 800 | 1 | 120 | 0 |
|  | 1200 | 1 | 100 | 0 |
| Sample F | 200 | x | — | — |
|  | 400 | x | — | — |
|  | 800 | x | — | — |
|  | 1200 | x | — | — |
| Sample G | 200 | 1 | 200 | 0 |
|  | 400 | 3 | 150 | 10 |
|  | 800 | 6 | 70 | 50 |
|  | 1200 | 11 | 40 | 40 |

The rotational frequencies of the sample disks were 200, 400, 800, and 1,200 rpm. In Table 1, the "number of irradiation for initialization" indicates the number of times of laser-beam irradiation required for the crystallization of one track, for initialization. The figures for the "recording-mark regenerative signal" indicate the amplitudes of AC signals for DC components obtained in the regeneration of recording portion. The "unerased signal" indicates the amount of AC signals remaining after the laser beam was applied once. In Sample F using an a-Si layer of 100 Å thickness, as shown in Table 1, silicon atoms diffused into the recording layer during the initialization, so that the recording layer turned into a different material. Accordingly, each of the blanks for the number of irradiation for initialization is marked with a cross (x).

In Samples A, B, C, D and E, as seen from Table 1, the frequency of irradiation for initialization can be lower, and the unerased signals are less, than in Sample G. For comparison between Samples A, B, C, D and E, there are some other variable factors, such as an enhancement effect. Basically, however, the thinner the a-Si protective layer, the more satisfactory the initialization and erasing characteristics will be. As regards the recording characteristic of these five samples, moreover, the reduction of the regenerative signals, caused by the increase in rotational frequency, is less than in Sample G. Practically, therefore, a satisfactory C/N (carrier to noise) can be expected of Samples A to E.

Besides Samples A to G of Table 1, alternative examples of similar layer arrangements, using an a-Si layer of 2,800 Å, were tested in the same manner. Thereupon, the figures for the initialization and erasing characteristics proved to be as low as those for Sample G.

EXAMPLE 2

Substrate 11, protective layer 12 and recording layer 13 were formed on the same laminate structure in the same manner as in Example 1. An a-Si layer 15, as a second protective layer, was formed on the recording layer 13 under the same conditions as those for the first protective layer 12. An ultraviolet-setting resin layer 16, as a third protective layer, was deposited with a thickness of 10 μm on the second protective layer.

In this example, the first and second protective layers have the same thickness. Samples similar to the ones described in connection with Example 1 were prepared using first protective layers with thicknesses of 2400, 1200, 800, 600, 300, and 100 Å. These samples were tested in the same manner as in Example 1.

Thereupon, the same characteristics of Example 1 were able to be obtained. In other words, the relationships between the characteristics and the thicknesses of the first and second protective layers of Example 2 proved to be substantially identical with those between the characteristics and the thickness of the first protective layer of Example 1.

More specifically, the initialization and erasing characteristics, in Example 2, were significantly improved by making the thicknesses of the first and second protective layers greater than 100 Å and smaller than 2,800 Å.

What is claimed is:

1. An information storage medium comprising:
   a substrate;
   a recording layer adapted to undergo phase transformation between different crystal phases when exposed to a light beam, said recording layer containing an InSb alloy;
   a first protective layer interposed between said substrate and said recording layer; and
   a second protective layer disposed on said recording layer;
   said first and second protective layers including an amorphous silicon-containing material.

2. An information storage medium according to claim 1, wherein said first and second protective layers are formed by sputtering.

3. An information storage medium according to claim 1, wherein said first and second protective layers have a thickness greater than 100 Å and smaller than 2,800 Å.

4. An information storage medium according to claim 4, wherein said first and second protective layers have a thickness ranging from 300 Å to 1,200 Å.

5. An information storage medium according to claim 1, further comprising a third protective layer disposed on the second protective layer, said third protective layer containing an organic resin.

6. An information storage medium comprising:
   a substrate;
   a recording layer which contains an InSb alloy and which undergoes phase transformation between different crystal phases within the recording layer when exposed to a light beam, said transformation between different crystal phases corresponding to recorded and erased portions, respectively; and
   a first protective layer interposed between the substrate and the recording layer, wherein said first protective layer comprises an amorphous silicon-containing material and thermally insulates said recording layer.

7. An information storage medium according to claim 6, further comprising a second protective layer disposed on said recording layer, said second protective layer containing an organic resin.

8. An information storage medium according to claim 7, wherein said recording layer contains an InSb alloy.

9. An information storage medium according to claim 7, wherein said first and second protective layers have a thickness greater than 100 Å and smaller than 2,800 Å.

10. An information storage medium according to claim 9, wherein said first and second protective layers have a thickness ranging from 300 Å to 1,200 Å.

11. A method of manufacturing an information storage medium, comprising the steps of:
    forming a first protective layer including an amorphous silicon-containing material, on a substrate by sputtering; and
    forming a recording layer on said first protective layer, wherein said recording layer contains InSb alloy and is adapted to undergo phase transformation between different crystal phases when exposed to a light beam, whereby information is recorded and erased.

12. A method according to claim 11, further comprising a step of forming, on said recording layer, a second protective layer including an amorphous silicon-containing material.

13. A method according to claim 12, further comprising a step of forming a third protective layer on said second protective layer, said third protective layer containing an organic resin.

14. A method according to claim 11, further comprising a step of forming, on said recording layer, a second protective layer containing an organic resin.

* * * * *